United States Patent Office 3,471,263
Patented Oct. 7, 1969

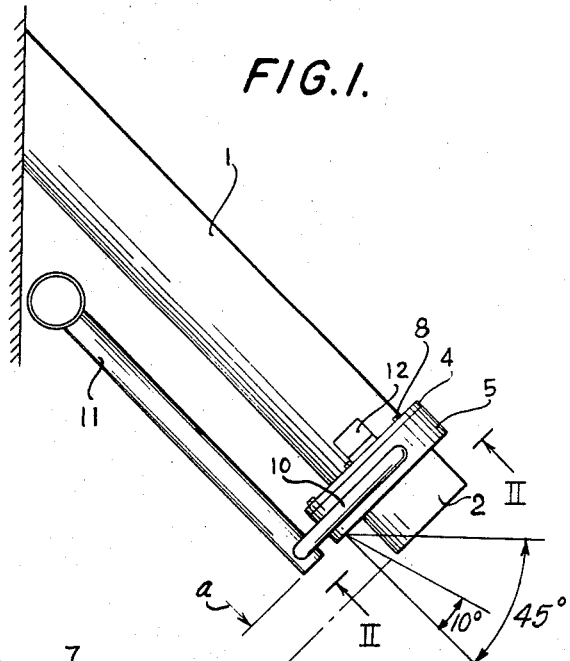
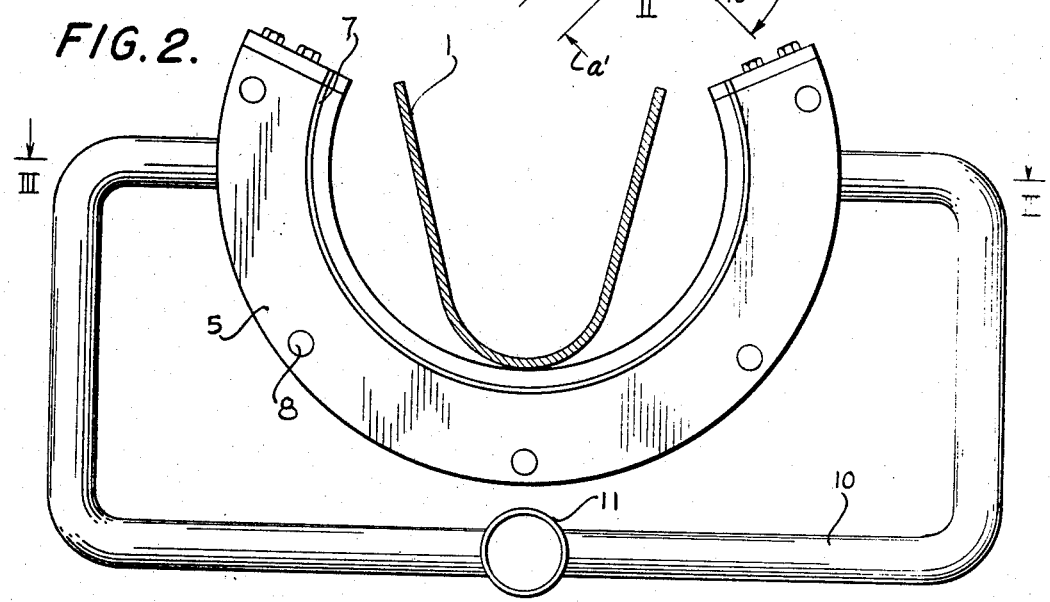
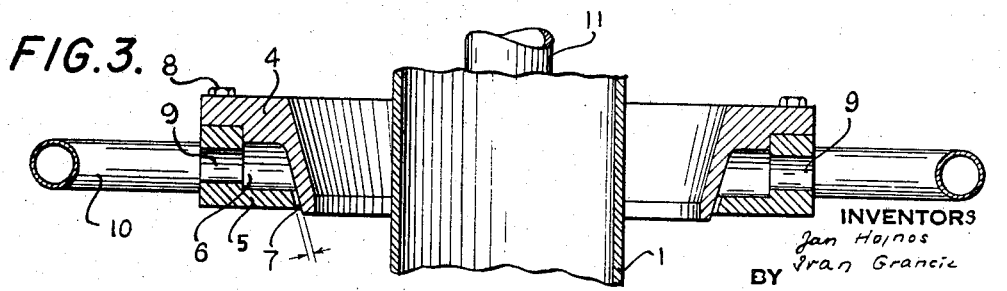

3,471,263
MIXING ARRANGEMENT
Jan Hojnos and Ivan Grancic, Bratislava, Czechoslovakia, assignors to Prvni Brnenska Strojirna Zavody Klementa Gottwalda, narodni podnik, Brno, Czechoslovakia
Filed Feb. 26, 1965, Ser. No. 435,746
Int. Cl. B01f 5/00
U.S. Cl. 23—252
5 Claims

ABSTRACT OF THE DISCLOSURE

A mixing arrangement for mixing two media which comprises a conduit having an open end for transporting one of the media out of the conduit through the open end thereof; and an at least partly annular conveying member having an at least partly annular outlet, the conveying member arranged about the conduit in the region of the one end thereof and having an at least partly annular outlet opening directed toward the outlet end of the conduit whereby a second medium forced through the conveying member and out through the at least partly annular outlet opening thereof will be directed toward the first medium leaving the conduit through the outlet end thereof and will become intimately intermixed with the same.

---

The present invention relates to a method and apparatus for regenerating sulfite and bisulfite liquors and, more particularly, the present invention is concerned with the regeneration of sodium sulfite and sodium bisulfite liquors which accrue in the production of cellulose from wood pulp and the like by treatment with neutral or acidic sodium sulfite.

Such methods require either to utilize the organic constituents of the waste liquor or to render the same harmless and, furthermore, to regenerate the spent active constituents of the liquor so that the same may be reused.

Several regenerating methods have been proposed, however, have met with only little practical success.

Thus, two methods were proposed which are based on the oxidation of the sodium sulfide in the melt after concentration and combustion of the organic constituents of the waste liquor.

According to one of these methods, the melt was cooled and then ground to a powder which was then passed in countercurrent to air, whereby contact with the oxygen of the air was supposed to cause oxidation of the sulfide to sulfite. However, this method did not meet with practical success.

According to another method, the highly concentrated aqueous solution of the melt is introduced into a rotary kiln, wherein, in contact with air the suspended sodium sulfide is to be oxidized to sulfite. In this case too it was not possible to find a practical solution for the difficulties found to be inherent in this process.

The spraying or atomizing of the molten inorganic salts containing melt which was to flow from the lower portion of the regenerating vessel into a dissolution tank was accomplished up to now by means of a pipe having a flattened opening through which air or steam was blown into the melt before the same dropped into the dissolution tank. This spraying arrangement is rather imperfect since it causes only partial comminution of the melt and this again results in rather severe explosions with relatively large bodies of melt having a temperature of between 700 and 900° C. dropped into the dissolution tank. These explosions are dangerous and create a health hazard. Furthermore, due to the explosions and the relatively high temperature of the melt, the independently arranged flattened spray pipe which is located below the trough leading from the regenerating vessel will be frequently bent and as a result thereof, the spraying medium or fluid will then only incompletely or not at all contact the stream of melt which is to be atomized. In this case, the explosions caused by the direct flow of the stream of hot melt into the liquid in the dissolution tank will become so severe that the process has to be interrupted in order to repair or replace the spray pipe.

It is therefore an object of the present invention to overcome the above discussed difficulties and disadvantages in the regeneration of spent sulfite and bisulfite liquors.

It is a further object of the present invention to provide a method and apparatus for oxidizing sulfide melts such as sodium sulfide-containing melts into sulfite.

It is yet another object of the present invention to provide a method and apparatus for the regeneration of sulfite and bisulfite, particularly sodium sulfite and sodium bisulfite waste liquors accruing in the production of cellulose, which method can be carried out in a relatively simple apparatus and in a simple and economical manner.

Other objects and advantages of the present invention will become apparent from a further reading of the description and of the appended claims.

With the above and other objects in view, the present invention contemplates a mixing arrangement for mixing two media, comprising, in combination, a conduit having an open end for transporting one of the media out of the conduit through such open end thereof, and an at least partly annular outlet, the conveying member arranged about the conduit in the region of the one end thereof and having an at least partly annular outlet opening directed toward the outlet end of the conduit whereby a second medium forced through the conveying member and out through the at least partly annular outlet opening thereof will be directed toward the first medium leaving the conduit through the outlet end thereof and will become intimately intermixed with the same.

The present invention also includes in a method of regenerating sodium sulfite and sodium bisulfite waste liquors, the steps of forming a stream of the thus formed melt consisting of the waste liquor substantially free of water and organic matter, contacting the stream of melt with a stream of gas of relatively low temperature and high pressure so as to finely subdivide and cool the melt thereby converting the same into a solid pulverulent material, and fluidizing the thus formed solid pulverulent material in an oxidizing gas, thereby oxidizing and regenerating the waste liquor.

Thus, according to the method of the present invention, the melt flowing from the regenerating vessel is atomized by contact with a gaseous medium under pressure and changed by the effect of the secondary gaseous medium into a solid powder having a temperature of between about 20 and 150° C., i.e., much lower than the temperature at which the melt leaves the regenerating vessel. Preferably, the thus obtained pulverulent material is graded by size and the main intermediate portion, excluding the fines and the very coarse particles is then introduced into a fluid bed reactor in which the pulverulent mass is fluidized and treated with an oxidizing gas.

In order to achieve complete oxidation of the sulfide, the oxidizing gas preferably will contain such a proportion of steam that the partial pressure of oxygen in the fluidized bed will be equal to between 40 and 150 mm./Hg, and the period of contact between the oxygen and the sulfide-sulfite in the fluidized bed will be between one-half hour and three hours.

The hot gases which are formed by contacting the stream of melt with the atomizing gas or air, as well as the waste gases of the fluidized bed reactor are recycled as combustion air into the regenerating vessel. Together with the waste gases, the very fine fly dust, or the fines from the atomizing of the melt and from the fluid bed reactor are also returned into the regenerating vessel.

The coarse portion of the pulverized melt is separated in a sifter and ground prior to introduction into the fluid bed reactor.

The oxidizing gases are introduced into the fluid bed reactor at a temperature of between 50 and 400° C. and at such speed that the pulverulent material in the reactor will form a fluidized bed.

The oxidized pulverulent material which is continuously withdrawn from the fluid bed reactor is dissolved in water and after saturation with gaseous sulfur dioxide used again as cooking liquor. In this manner, the regenerating cycle is completed. By the repeated utilization of the hot waste gases from the atomizing of the melt coming from the regenerating vessel and of the hot waste gases from the fluidized bed reactor, the heat which is absorbed by these gases from the melt during atomizing of the same and during the exothermic oxidation of the sulfides in the fluidized bed reactor is, for all practical purposes, completely recovered.

The circular flow of the fines (which are returned to the regenerating vessel) and the utilization of the heat as well as of the oxygen of the waste gases in the regenerating of subsequent portions of spent liquor in the regenerating vessel represents very significant advantages of the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic elevational view of the conduit leading from the regenerating vessel and of the atomizing arrangement connected therewith;

FIG. 2 is a schematic cross sectional view taken along line II—II of FIG. 1; and FIG. 3 is a cross sectional view taken along line III—III of FIG. 2.

According to the present invention, the spraying or atomizing device is arranged underneath a conduit or elongated trough through which the melt passes from the regenerating vessel. The atomizing device comprises two segments of semi-circular cross section which are connected with each other and which form between themselves a chamber for the atomizing medium or gas, which chamber communicates with a more or less semi-circular gap or partly annular outlet opening of preferably adjustable width and inclination.

Preferably the gap is located in a conical surface forming, as shown in FIG. 1, an angle of between 10 and 45° with the axis of the conduit or trough about which the conveying member forming such gap is arranged.

The conveying or atomizing device is firmly arranged at the lower side of the elongated trough or conduit, preferably at a distance of between 50 and 100 mm. from the outlet end thereof as indicated in FIG. 1 by arrows $a$, $a'$. The trough usually extends downwardly from the regenerating vessel, substantially at the inclination indicated in FIG. 1. One of the segments of the atomizing device includes an inlet for the generally gaseous atomizing medium. The gap or partly annular outlet opening through which the atomizing medium will leave the atomizing device is so constructed that the gaseous atomizing medium, for instance, air or steam will leave the gap under a pressure of between about 3 and 11 absolute atmospheres. The stream of atomizing fluid will be directed through the gap towards the molten stream having passed through the open end of the elongated trough or conduit, in the shape of a partially cone-shaped shell and will cause that the entire stream of melt is drawn into the area of the apex of the cone defined by the stream of atomizing medium so that the melt will be finely subdivided or atomized in the area of the apex of the cone.

To arrange the atomizing device directly at the lower portion of the conduit for the melt leading from the regenerating vessel, in the vicinity of the open end of such conduit or elongated trough, it is particularly advantageous because upon movement of the trough during operation, the position of the atomizing device relative to the trough will not change and the atomizing device will not come in direct contact with the melt. The substantially semi-circular cross section of the gap and of the entire atomizing device has the further advantage that a highly effective partially cone-shaped stream of atomizing fluid will be directed towards the melt, however, without any possibility of plugging the atomizing device with portions of the melt. The arrangement of the present invention is excellently suitable not only when it is desired to finely subdivide the melt so that the melt in such subdivided form would then drop into a solution contained in a dissolution vessel, but also for methods according to which the melt is finely subdivided so as to form thereof a dry pulverulent product.

Referring now to the drawings, it will be seen that the illustrated arrangement consists of an open channel-shaped or trough-shaped conduit 1 which is arranged downwardly inclined as shown in FIG. 1 and has an open outlet end 2. Near this outlet end, preferably at a distance of between 50 to 150 mm. from this outlet end, there is arranged an annular distributing or conveying member consisting, as shown in FIGS. 2 and 3, of two annular members 4 and 5 forming a chamber 6 between themselves. These annular members are shaped so as to define an arcuate outlet nozzle in form of a conical gap 7 the conicity of which is such that the conical surface in which this gap is located intersects the axis of the conduit 1 in front of the outlet opening thereof. The two annular members 4 and 5 are secured to each other by the screws 8. Furthermore, the chamber 5 is provided with two inlet openings 9 which communicate with inlet conduit 10. This inlet conduit has an inlet pipe 11 adapted to be connected with a source of gaseous medium. The entire distributing arrangement is secured by brackets 12 to the outer face of the channel-shaped conduit 1, preferably by welding or the like.

It will be understood that each of the elements described above, or two or more together, may find a useful application in other types of mixing arrangements differing from the types described above.

While the invention has been illustrated and described as embodied in a mixing and atomizing arrangement for the melt obtained in the regeneration of sodium sulfite and sodium bisulfite waste liquors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features, that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Mixing arrangement for mixing two media, comprising, in combination, an elongated trough-shaped conduit being open at its top and having an open end for transporting one of said media out of said open trough-shaped conduit through said open end thereof; and a conveying member arranged about said conduit in the region of said open end thereof but spaced rearwardly of the latter and forming an arcuate outlet nozzle extending about said elongated open trough-shaped conduit in transversal direction to the elongation thereof but without extending over said open top thereof, said arcuate outlet nozzle being directed toward said open end of said open trough-shaped conduit in a direction forming an acute angle with the direction of elongation thereof, whereby a second medium forced through said conveying member and out through said arcuate outlet nozzle thereof will be directed from different directions towards the first medium leaving said conduit through said open end thereof and will become intimately mixed with the same.

2. A mixing arrangement as defined in claim 1 wherein said outlet nozzle forms a partly conical outlet gap.

3. A mixing arrangement as defined in claim 2 wherein the conicity of said outlet gap is such that the apex of said partly conical outlet gap intersects the axis of said conduit in front of said open end thereof.

4. A mixing arrangement as defined in claim 1, wherein said conveying member comprises two wall portions forming between themselves a chamber adapted to hold a second, fluid medium, said wall portions forming between themselves in the direction towards said open end of said conduit said nozzle communicating with said chamber and in part bounded by a conical surface which intersects the axis of said conduit in front of said open end thereof.

5. A mixing arrangement as defined in claim 4, wherein said conical surface intersects the axis of said conduit in front of said outlet thereof at an angle of between 10 and 45 degrees.

References Cited

UNITED STATES PATENTS

| | | | |
|---|---|---|---|
| 1,026,724 | 5/1912 | Trump et al. | 264—12 |
| 2,006,891 | 7/1935 | Hegmann | 23—139 |
| 2,007,799 | 7/1935 | Gloersen | 23—285 |
| 2,308,584 | 1/1943 | Best | 264—12 |
| 2,460,884 | 2/1949 | Hjort et al. | 23—252 |
| 3,222,134 | 12/1965 | Peterson | 23—252 |
| 3,251,653 | 5/1966 | Aditya | 23—252 |
| 3,232,700 | 2/1966 | Englund et al. | 23—48 |
| 3,248,169 | 4/1966 | Mannbro | 23—48 |

JAMES H. TAYMAN JR., Primary Examiner

U.S. Cl. X.R.

23—48, 49, 262, 285; 239—424; 261—116